United States Patent

[11] 3,634,118

[72] Inventor Kenneth B. Stokes
       Minneapolis, Minn.
[21] Appl. No. 20,798
[22] Filed Mar. 18, 1970
[45] Patented Jan. 11, 1972
[73] Assignee General Mills, Inc.

[54] NITROCELLULOSE COATINGS IMPROVED BY CERTAIN OXIME ADDUCTS OF POLYMERIC FAT ACID BASED ISOCYANATES
12 Claims, No Drawings

[52] U.S. Cl....................................................... 106/171,
       106/186, 106/187, 106/191, 106/195, 106/204,
       117/124, 117/132, 117/148, 117/148, 117/166,
       260/482

[51] Int. Cl....................................................... C08b 21/12
[50] Field of Search........................................... 106/186,
       195, 171, 169; 260/77.5 AT, 13; 117/166

[56] References Cited
UNITED STATES PATENTS
3,475,356 10/1969 Davis............................. 260/13

Primary Examiner—Theodore Morris
Attorneys—Anthony A. Juettner and Gene O. Enockson ABSTRACT: Nitrocellulose coatings are improved through the use of adducts of certain aliphatic oximes and polymeric fat acid based isocyanates.

NITROCELLULOSE COATINGS IMPROVED BY CERTAIN OXIME ADDUCTS OF POLYMERIC FAT ACID BASED ISOCYANATES

The present invention relates to improved nitrocellulose coatings and to the process of preparing such coatings. More particularly, it relates to the improvement of nitrocellulose coatings through the use of certain oxime adducts of polymeric fat acid based isocyanates. The invention further relates to the coating compositions and certain of the adducts forming an essential part thereof.

Conventional nitrocellulose lacquers have low impact resistance and are soluble in many solvents. By incorporating certain isocyanates in the system, coatings based on toluene wet nitrocellulose have improved solvent resistance because of cross-linking. Impact resistance is not necessarily improved, however. Furthermore, with certain isocyanates, an undesirable induction period is required before the coating can be employed.

More recently, it was discovered that nitrocellulose coatings could be improved by the use of a combination of polymeric fat acid based isocyanates and certain ketimine or aldimine blocked polyamines including derivatives of the latter. The undesirable induction period was accordingly reduced using this combination. However, the same still presented certain disadvantages. Thus from a practical standpoint, such coating system has to be packaged in three separate containers—i.e., a container for each of the following: (1) the nitrocellulose, (2) the isocyanate and (3) the ketimine or aldimine with any catalyst. In addition, the coatings prepared from such system tended to develop a dark color.

I have now discovered that nitrocellulose coatings can be prepared using certain oxime adducts of polymeric fat acid based polyisocyanates to improve various characteristics of the coating including impact resistance and in most instances color. In addition my invention provides one- and two-can coating systems which makes the same especially commercially feasible.

The nitrocellulose employed in this invention is not limited to a particular grade or type, but can be any type generally suitable for the preparation of nitrocellulose coating compositions. It is, however, preferred to use toluene wet nitrocellulose (11.8–12.2 percent nitrogen) having a viscosity of one-fourth second, three-eighths second, one-half second or five-sixths second. It is especially preferred to employ one-fourth- and/or one-half-second RS nitrocellulose.

As indicated above, the polyisocyanates employed in the present invention are derived from polymeric fat acids and have the following idealized structural formula:

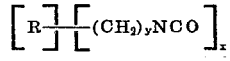

where $y$ is 0 or 1, $x$ is an integer of 2 to about 4 and R is the hydrocarbon group of polymeric fat acids. Preferably $x$ is 2. The polyisocyanates of the above formula wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. This method of preparation can be conveniently illustrated by the following equations (using a dimeric fat acid as an example)

3D(COOH)₂cyz2PCL₃ → 3D(COCL)₂+2H₃PO₃
D(COCl)₂+2NaN₃ → D(CON₃)₂+2NaCl
D(CON₃)₂ → D(NCO)₂+2N₂

The polyisocyanates wherein $y$ is 1 are prepared by converting the polymeric fat acids to the corresponding polynitriles and then hydrogenating the polynitriles in the presence of ammonia and a catalyst such as Raney nickel to form the polyamines.

The polyamines are then reacted with phosgene to give the polyisocyanates. This method of preparation can be conveniently illustrated by the following equations (using a dimeric fat acid as an example):

D(COOH)₂+c2NH₃ → D(CN)₂+4H₂O

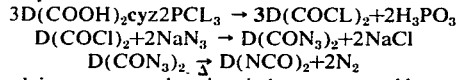

D(CH₂NH₂)₂+COCl₂ → D(CH₂NCO)₂2HCl

The polymeric fat acids, useful as the starting materials for preparing the above polyisocyanates, are prepared by polymerizing ethylenically unsaturated monobasic carboxylic acids having 16 to 22 carbon atoms or the lower alkyl esters thereof. The preferred aliphatic acids are the mono- and polyolefinically unsaturated 18 carbon atom acids. Representative octadecenoic acids are 4-octadecenoic, 5-octadecenoic, 6-octadecenoic (petroselinic), 7-octadecenoic, 8-octadecenoic, cis-9-octadecenoic (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatrienoic (linolenic), 6,9,12-octadecatrienoic, 9,11,13-octadecatrienoic (eleostearic), 10,12,14-octadecatrienoic (pseudo eleostearic) and the like. A representative 18 carbon atom acid having more than three double bonds is moroctic acid which is indicated to be 4,8,12,15-octadecatetraenoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18-eicosapentanoic (timnodonic), 13-docosenoic (erucic), 11-docosenoic (cetoleic), and the like.

The ethylenically unsaturated acids can by polymerized using known catalytic or noncatalytic polymerization techniques. With the use of heat alone, the mono-olefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the nonconjugated positions. Clay catalysts are commonly used to accelerate the polymerization of the unsaturated acids. Lower temperatures are generally used when a catalyst is employed.

The polyisocyanate derived from these dimeric fat radicals and trimeric fat radicals may be referred to hereinafter by the names dimeryl isocyanate and trimeryl isocyanate. These materials may be produced from mixtures of dimer and trimer fat acid and the relative quantities may be controlled by the degree to which the individual compounds have been isolated in preparing the dimer and trimer fat acids.

The adducts useful in the present invention are prepared from the described isocyanates and certain aliphatic (including cycloaliphatic) oximes. The useful oximes have the general formula

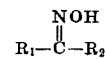

where R₁ and R₂ are selected from the group consisting of hydrogen and aliphatic groups of one to 10 carbon atoms with the proviso that the total number of carbon atoms in said groups does not exceed 10. Representative aliphatic groups are methyl, ethyl, propyl, isopropyl, butyl, isobutyl, pentyl, hexyl, heptyl, octyl, nonyl, decyl, cyclohexyl and the like. Preferred oximes are those in which the total number of carbon atoms in R₁ and R₂ is six or less. An especially preferred oxime is 2-butanone oxime.

The adducts are prepared by simply reacting the polymeric fat acid polyisocyanate with the oxime at temperatures below the point where the adduct would revert back to or decompose to the starting materials. Thus reaction temperatures of up to about 110° C. can be used and temperatures of between about 25° to 110° C. are preferred. The reaction may be carried out in the presence of an inert organic solvent such as dioxane, acetone, mineral spirits, benzene or the like and such solvent, if desired, can then be removed at the completion of the reaction.

The equivalent ratio of polyisocyanate to oxime in preparing the adducts can vary from about 4:1 to 1:1. Where the equivalent ratio is 1:1, the adducts have the formula:

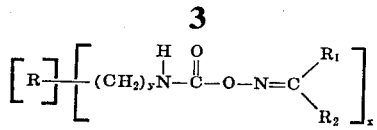

where R, $R_1$, $R_2$, $x$ and $y$ are as defined above. These fully reacted adducts find use in preparing nitrocellulose coatings using a one-can system with heating to decompose or unblock some or all of the isocyanate groups. Clear coatings having good properties are obtained therefrom where $y$ is 0—i.e., the isocyanate is prepared by the azide process as above described. Darker coatings of good properties are obtained using such fully reacted adducts where $y$ is 1—i.e., the isocyanate is prepared by the phosgene process as above described. It is preferred in these instances as well as in general to use diisocyanates (i.e. $x$ is 2) in the preparation of the adducts.

Where an excess of isocyanate is employed in preparing the adducts, the same will contain free NCO groups and in many instances will represent a mixture of free polyisocyanate and polyisocyanate having one or more NCO group reacted with or blocked by the oxime. As such, two-can systems are required to prepare the coatings of the invention—i.e., (1) nitrocellulose and (2) the adduct. However, where such adducts are prepared from approximately 4 equivalents of polyisocyanate to 1 equivalent of oxime, the resulting coating will cure at ambient temperatures (although heating may be optionally used). Where the ratio of polyisocyanate to oxime is under 4:1 but not as low as 1:1, the adducts find use as two-can systems with the nitrocellulose but heating is required to decompose or unblock some of the oxime blocked NCO groups in order to provide the necessary degree of cross-linking and thus give adequate solvent resistance to the coatings.

In addition to the nitrocellulose and the polyisocyanate-oxime adduct, the compositions useful in preparing the coatings in accordance with the present invention also preferably contain a urethane catalyst. A preferred catalyst is dibutyl tin dilaurate. Other useful catalysts of the described type are $Bi(NO_3)_3 \cdot 5H_2O$, ferric acetyl acetonate hydrate, dibutyl tin dichloride, and the like. It is highly desirable to include the catalyst since in the absence thereof, a very long induction period may be necessary before application of the coating composition to the substrate. During such long induction period, the compositions may be hazy making it difficult or almost impossible to apply the same smoothly to the substrate. Furthermore, the desired degree of cross-linking may not occur in some instances in the absence of the catalyst.

In a conventional manner, the nitrocellulose and other reactants are dissolved in an organic solvent or thinner. Any of the solvents conventionally used in nitrocellulose coating compositions or lacquers may be used provided that they are free of alcohols or water. Such solvents include ketones such as methyl ethyl ketone, methyl isobutyl ketone and diisobutyl ketone, hydrocarbons such as xylene, toluene and petroleum naphtha, esters such as ethyl acetate and butyl acetate, and the like.

Various other optional additives can be included for their known uses such as dyes, pigments, plasticizers, flow control agents and the like.

The polyisocyanate-oxime adduct is used in an amount of about 10 to 150 percent based on the weight of the nitrocellulose solids. Preferably the polyisocyanate-oxime adduct is used in an amount of about 40 to 100 percent based on the weight of the nitrocellulose.

The quantity of solvent or thinner is such as to provide a total solids content (i.e. nitrocellulose and polyisocyanate-oxime adduct) in the range of 5 to 30 percent by weight, and more preferably 15 to 20 percent by weight. The catalyst, when present, is used in catalytic amounts which are preferably 0.1 to 10 percent by weight based on the weight of the isocyanate.

While the nitrocellulose and polyisocyanate-oxime adduct can be admixed with the solvent and other components close to the time of use and then applied as a coating to various substrates, the special commercial attractiveness resides in the one- and two-can compositions which have good stability and which provide ultimately the improved coatings of the invention. The one-can compositions are obtained by mixing all of the ingredients when the adduct used therein is prepared from equivalent amounts of polyisocyanate and oxime. The two-can systems are provided wherein one portion contains the nitrocellulose and the other the adduct wherein excess polyisocyanate is used with the oxime in the adduct preparation. Part of the solvent can be used in each portion so as to equalize the relative amounts of the two portions. The catalyst is preferably included in the nitrocellulose portion.

The coating compositions can be applied to the substrate by any of the conventional procedures including brushing, rolling, spraying, use of bar applicators and the like. A wide variety of substrates can be coated in accordance with my invention including glass, metals, plastics, wood etc. However, the coatings are particularly valuable for wood (i.e. in furniture manufacture) and primed metals (i.e. automobile production). Coating thickness is not critical but preferably is in the range of 0.5 to 5.0 mils.

As indicated, curing is carried out at ambient temperatures (adduct from about 4:1 equivalent ratio of polyisocyanate to oxime) or at temperatures sufficient to decompose or unblock the oxime blocked NCO groups of the adduct. Temperatures of above 110° C. and preferably in the range of 150° to 200° C. can be used to cure the coatings.

In the examples to follow, the dimeryl isocyanates employed in preparing the adducts have the formulas

A. $OCN-CH_2-D-CH_2-NCO$ and

B. $OCN-D-NCO$ where D is the divalent hydrocarbon radical of the dimerized fat acids obtained by polymerizing and hydrogenating (in the presence of palladium catalyst) the mixture of fat acids derived from tall oil (composed of approximately 40–45 percent linoleic and 50–55 percent oleic, such percentages being by weight).

The following examples A–D illustrate the preparation of the adducts in accordance with the invention.

EXAMPLE A

An adduct was prepared by mixing 1,200 g. (4 equivalents) of dimeryl isocyanate having the formula (A) above with 87 g. (1 equivalent) 2-butanone oxime at room temperature (25° C.) The reaction produced a moderate exotherm of about 25° C.

EXAMPLE B

Example A was essentially repeated except that 1,185 g. of dimeryl isocyanate of formula (B) above was used in place of the formula (A) isocyanate.

EXAMPLE C

Example A was essentially repeated except that equivalent amounts of dimeryl isocyanate and 2-butanone oxime were used. The resulting adduct had the formula

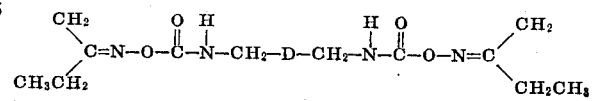

EXAMPLE D

Example C was essentially repeated using the dimeryl isocyanate of formula (B) above in place of the formula (A) isocyanate. The resulting adduct had the formula

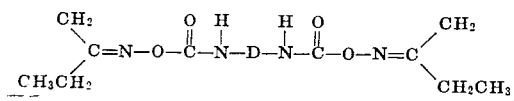

The above illustrative adducts were then used to prepare coatings in accordance with the following examples which show certain preferred aspects of the invention without limiting the same thereto.

EXAMPLE E

A two-part (two-can) coating composition system was prepared from the following components:

| PART A | Parts By Weight |
| --- | --- |
| Nitrocellulose (¼ sec. RS 70% by weight in toluene) | 10.0 |
| Dibutyl tin dilaurate | 0.07 |
| Toluene | 21.5 |
| Methyl ethyl ketone | 10.5 |
| Cellosolve acetate | 7.0 |
| Butyl acetate | 14.0 |
| Total | 63.07 |

| PART B | Parts By Weight |
| --- | --- |
| Adduct of Example A | 7.0 |
| Total | 7.0 |

The coating composition was prepared by adding part B to part A with mixing. Such composition had a solids content of 20 percent, an initial viscosity (Gardner-Holdt) of C and a pot life of 16 hours. It was applied to various substrates as a 1–2 mil wet film using a Bird applicator. Such coatings dried rapidly (in approximately 30 minutes). They were allowed to cure for 14 days and then subjected to various tests, the results being set forth in the following table I. This table also gives results (some tests not undertaken) for a known commercial nitrocellulose lacquer formulation applied in the same manner and prepared by mixing 13.8 parts Desmodur N (75 percent by weight in Cellosolve acetate: xylene—50:50) with an admixture of 16.0 parts nitrocellulose (¼-sec. RS, 70 percent by weight in toluene), 17 parts plasticizer (Alkydal F-25, 50 percent by weight in toluene), 0.1 part zinc octoate, 83.7 parts toluene 24.0 parts methyl ethyl ketone, 29.9 parts Cellosolve acetate and 59.7 parts butyl acetate.

TABLE I

| | Coating of Invention | Known Coating |
| --- | --- | --- |
| Pencil hardness[1] | 2–4B | HB |
| Sward hardness (%)[1] | 32 | — |
| G. E. Extensibility (%)[2] | 60+ | — |
| Reverse impact (in. lb.)[3] | 40–44 | 4–8 |
| Forward impact (in. lb.)[3] | 52–56 | 8–12 |
| Gloss (60°)[1] | 92–100 | — |
| "B" color[5] | 6.4 | — |
| Solvent resistance (24 hours)[6] | | |
| Water[1] | NC | NC |
| Sat. ZnCl₂[1] | NC | NC |
| 37% H₂SO₄[1] | NC | NC |
| 20% NaOH[1] | NC | NC |
| Cottonseed oil[1] | NC | NC |
| Absolute ethanol[3] | S | S |

[1] Coating on glass

[2] Coating on black plate

[3] Coating on phosphatized polished cold rolled steel

[4] Coating on wood

[5] Coating on Carrara Glass

[6] Immersion for 24 hours—NC means no change; S means soft

The above data show the excellent properties of the coatings prepared in accordance with the invention. A particularly important aspect is the good impact resistance in comparison to the known coating. Further good properties are shown by the following example.

EXAMPLE F

One hundred grams RS ¼-sec. isopropanol wet nitrocellulose was dissolved in 75 g. isopropanol and 105 g. methyl ethyl ketone. Twenty-eight parts by weight of this solution were mixed with 0.07 parts by weight dibutyl tin dilaurate and 9 parts by weight of the adduct of example D. The resulting solution had a stable viscosity at room temperature. Coatings were applied with a Bird applicator as in example E, then baked 15 min. at 150° to 180° C. The clear coatings were relatively soft (6–7B pencil hardness, 10 percent Sward Hardness) but very impact resistant (40–44 in.-lb. reverse, 72–76 in.-lb. direct on phosphatized polished cold rolled steel). Dry adhesion was excellent to aluminum, glass, cold rolled steel, polished cold rolled steel, phosphatized steel, and black plate. The coatings were not soluble in base (20 percent NaOH) or organic acetates.

It is to be understood that the invention is not to be limited to the exact details of operation or the exact compositions shown or described, as obvious modifications and equivalents will be apparent to those skilled in the art and the invention is to be limited only the the scope of the appended claims.

The embodiments of the invention in which an exclusive property or privilege is claimed are defined as follows:

1. A process of coating a substrate which comprises: (1) applying to such substrate a coating of a composition comprising (A) nitrocellulose, (B) 10 to 150 percent by weight based on the weight of the nitrocellulose of an adduct of (a) a polyisocyanate of the formula

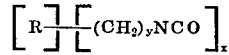

where $y$ is 0 or 1, $x$ is an integer of 2 to about 4 and R is the hydrocarbon group of polymeric fat acids prepared by polymerizing ethylenically unsaturated monobasic carboxylic acids having 16 to 22 carbon atoms with (b) an oxime of the formula

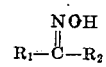

where $R_1$ and $R_2$ are hydrogen or aliphatic groups of one to 10 carbon atoms with the proviso that the total number of carbon atoms in $R_1$ and $R_2$ does not exceed 10, said adduct having been prepared by reacting the polyisocyanate and oxime in an equivalent ratio of from about 4:1 to 1:1, and (C) an organic solvent in an amount such that the composition contains a total of about 5 to 30 percent by weight of components (A) and (B); and (2) curing the coating.

2. The process of claim 1 wherein $x$ is 2.

3. The process of claim 2 wherein $y$ is 1.

4. The process of claim 2 wherein the equivalent ratio of polyisocyanate (a) to oxime (b) in the adduct is about 4:1.

5. The process of claim 4 where $R_1$ is $CH_3$, $R_2$ is $CH_2CH_3$ and the curing (2) is carried out at ambient room temperature.

6. The process of claim 2 wherein the equivalent ratio of polyisocyanate (a) to oxime (b) in the adduct is 1:1 and such adduct has the formula

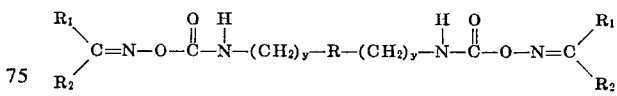

7. The process of claim 6 wherein y is O, $R_1$ is $CH_3$, $R_2$ is $CH_2CH_3$ and the curing (2) is carried out at temperatures of 110° to 220° C.

8. The process of claim 1 wherein the composition also contains about 0.1 to 10.0 percent by weight based on the weight of the adduct (B) of (D) a urethane catalyst.

9. The coated substrate prepared by the process of claim 1.

10. A one-can coating composition comprising (A) nitrocellulose, (B) 10 to 150 percent by weight based on the weight of the nitrocellulose of an adduct of the formula

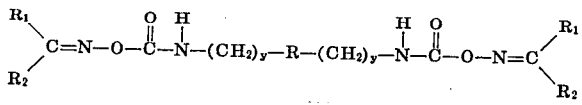

where y is 0 or 1, R is the hydrocarbon group of polymeric fat acids prepared by polymerizing ethylenically unsaturated monobasic carboxylic acids having 16 to 22 carbon atoms and $R_1$ and $R_2$ are hydrogen or aliphatic groups of one to 10 carbon atoms with the proviso that the total number of carbon atoms in said groups does not exceed 10 and (C) an organic solvent in an amount such that the composition contains a total of about 5 to 30 percent by weight of components (A) and (B).

11. The composition of claim 10 wherein y is 0, $R_1$ is $CH_3$, $R_2$ is $CH_2CH_3$ and the composition also contains about 0.1 to 10.0 percent by weight based on the weight of the adduct (B) of (D) a urethane catalyst.

12. The composition of claim 11 wherein the catalyst is dibutyl tin dilaurate and R is the divalent hydrocarbon group prepared by polymerizing an 18 carbon atom ethylenically unsaturated monobasic carboxylic acid.

* * * * *